United States Patent [19]

Ikeuchi

[11] 4,284,239
[45] Aug. 18, 1981

[54] ATOMIZING UNIT OF TWO-PHASE TYPE

[76] Inventor: Hiroshi Ikeuchi, 2-8-703, Hirata-cho, Ashiya-shi, Hyogo-ken, Japan

[21] Appl. No.: 81,618

[22] Filed: Oct. 3, 1979

[30] Foreign Application Priority Data

Oct. 3, 1978 [JP] Japan .................................. 53-122155

[51] Int. Cl.³ ............................................ B05B 7/08
[52] U.S. Cl. ....................................... 239/8; 239/419.3; 239/422; 239/425; 239/432; 239/544; 239/DIG. 19
[58] Field of Search ................ 239/8, 418, 419.3, 422, 239/424.5, 425, 428, 429, 432, 427.3, 543, 544, DIG. 19

[56] References Cited

U.S. PATENT DOCUMENTS

| 1,070,872 | 8/1913 | Bond | 239/425 X |
| 3,062,454 | 11/1962 | Cocks | 239/543 X |

FOREIGN PATENT DOCUMENTS

| 41864 | 12/1962 | Japan . | |
| 4330394 | 12/1962 | Japan . | |
| 1030190 | 5/1966 | United Kingdom | 239/419.3 |
| 1499671 | 2/1978 | United Kingdom . | |

Primary Examiner—Andres Kashnikow
Attorney, Agent, or Firm—Wenderoth, Lind & Ponack

[57] ABSTRACT

An atomizing unit comprises a plurality of nozzle-members, each of which is capable of producing a compressed air flow entraining a number of minute liquid-particles. The nozzle-members are mounted on the unit in a manner such that respective tube-like flows of two-phase discharged from the respective nozzle-members further violently collide among them at a point forwardly spaced by a predetermined distance from a leading head of the unit. By the arrangement mentioned above, minute liquid-particles entrained by the respective tube-like flows are further split into a still large number of much finer liquid-particles and then further forwardly dispersed as a stream of mist by a secondary flow produced at the point mentioned above.

5 Claims, 11 Drawing Figures

Fig. 7
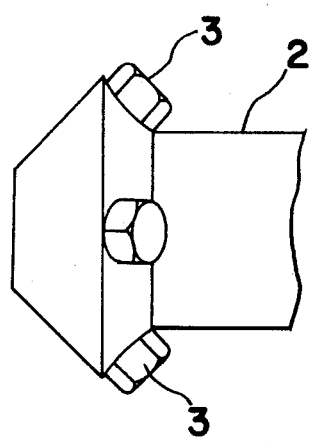
Fig. 8
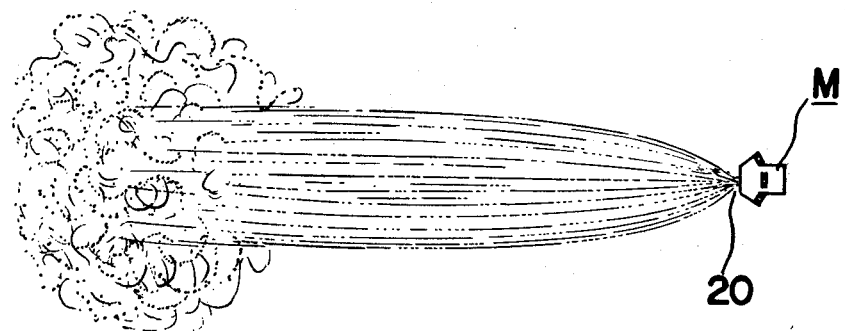
Fig. 9(a)　　　Fig. 9(b)
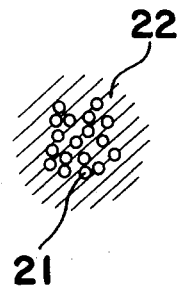 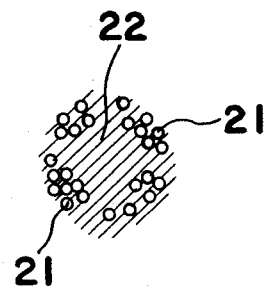

ATOMIZING UNIT OF TWO-PHASE TYPE

BACKGROUND OF THE INVENTION

This invention relates to a liquid atomizer to be used for atomizing of liquids and more particularly, to a two-phase type atomizing unit which can atomize liquids such as water, liquid-fuel and the like to such an extent that the liquids atomized produce a mist of liquid with respective particle-diameters being in the range from a sub-micron order to at most some tens of microns and is easily applied to many engineering operations including atomizing operations without any difficulties at all.

Up to the present, there have been proposed and developed a number of specific types of spraying nozzles of the two phase or one phase type and, at the present, almost all forms of atomizing operations can be accomplished, provided that a suitable atomizing nozzle, i.e. one which has a specific capacity in respect to the generation of mist having a predetermined range of atomized liquid particle diameters, is only chosen properly.

In spite of this, in order to cope with a recent demand for generation of a large amount of mist of liquid having much smaller particle-diameters, i.e., respective particle-diameters are sometimes in the range from a sub-micron order to some tens of microns, hardly any suitable conventional spraying nozzles or the systems in which they are incorporated are available. Therefore, to respond to the recent trend of liquid atomization as mentioned above, the engineering in the field of liquid atomization has been further developed, thus resulting in a specific type of liquid atomizer, which is designated an ultrasonic atomizing nozzle, has been recently proposed. More specifically, the ultrasonic atomizing nozzle has an approximate double conduit shape in section and comprises an inner conduit portion for compressible fluid, and an annular conduit portion for incompressible fluid, the forward end of which is, however, closed and is communicated with the inner conduit through a plurality of holes, and a resonance chamber which is spaced from the discharging outlet of the nozzle body a predetermined distance, with an open end portion being confronted by the discharging outlet of the nozzle body. By the arrangement as described above, a flow of compressed air introduced into the conduit portion is forcibly interrupted when blocked by the inner surface of the resonance chamber, whereby a strong supersonic energy field is produced in a space which is interposed between the discharging outlet of the nozzle body and the open end portion of the chamber. The liquid inside the annular conduit portion is accordingly drawn, via holes, into a flow of compressed air through the supersonic energy field being produced, whereby the liquid is split into numerous minute liquid-particles and then is forcibly dispersed into the open air as a mist while being entrained by the air flow secondarily produced. For the generation of mist with this arrangement, the air to be introduced should be compressed at a pressure higher than 0.5 Kg/cm$^2$ and therefore, the air compressed at a pressure ranging from 1 to 6 Kg/cm$^2$ is conventionally introduced. Such being the case, since such highly compressed air as described above has to be supplied, employment of air compressor of the piston displacement type is indispensable. Furthermore, since the ultrasonic atomizing nozzle requires a considerable amount of compressed air, the air compressor of the above-described type must be large-size, particularly if a plurality of nozzles of the above-described type are simultaneously employed so as to constitute a mist generating system. Hence, as is well known by those skilled in the art, as far as the air compressor of the above-described type is concerned, since the amount of compressed air produced in relation to the electrical power consumed is relatively small, mist generation with the ultrasonic atomizing nozzles consequently is quite an expensive operation.

So far as the simultaneous employment of a plurality of ultrasonic atomizing nozzles is concerned, there are further undesirable problems as follows.

First of all, the use of a large-size air compressor of the piston displacement type will bring about a public nuisance due to the undesirable noise problem. In addition, when the ultrasonic atomizing nozzles are arrayed in series so as to generate a large amount of mist at the same time, the amounts of mist respectively dispersed from the ultrasonic atomizing nozzles tend to be superimposed, and frequencies of impingements of minute liquids particles are increased, thus resulting in agglomeration. The large liquid drops thus formed no longer float in the air, whereby not only is the range of dispersement of mist thus generated reduced, but also a ground field in which the atomization is carried out becomes soaking wet accordingly. The undesirable situations mentioned above can not be avoided, so long as a large amount of mist constituted by liquid-particles each having such a minute particle-diameter has to be generated with the help of more than one ultrasonic atomizing nozzle of the above-described type.

SUMMARY OF THE INVENTION

Accordingly, an essential object of the present invention is to provide a two-phase type atomizing unit which can atomize water and the like to such an extent that liquids atomized produce a mist of liquid with respective particle-diameters being in the range from a sub-micron order to at most one hundred microns.

Another important object of the present invention is to provide an atomizing unit of the above-described type, which can generate a mist of liquid the particle-diameter distribution of which is as narrow as possible, with an average of at most some tens of microns.

A further object of the present invention is to provide an atomizing unit of the above-described type, which can effectively generate a large amount of mist as described above with a relatively small amount of compressed air under comparatively low compressing pressure condition.

A still further object of the present invention is to provide an atomizing unit of the above-described type, which has a simple structure and thereby can be readily applied to any engineering operation including an atomizing operation.

In accomplishing these and other objects according to one preferred embodiment of the present invention, there is provided an atomizing unit as will be specifically described hereinbelow. The atomizing unit according to the present invention comprises an adaptor having two inlets opened towards the outside which are respectively coupled to respective members for introducing a compressible fluid in a compressed condition and an incompressible fluid therethrough, a body-member which is coupled by a head portion of an adaptor and six nozzle-members which are respectively accommodated within a head portion of the body-member in a manner such that respective extensions of axial lines of respective nozzle-members meet at a point spaced forwardly equal distances from the respective front ends of the respective nozzle-members. Accordingly, the number of holes which are provided in the body-member and are respectively partially internally threaded is equivalent to the number of the nozzle-members. Each nozzle-member is provided with a rectangular groove at its base end for engagement by a screw driver, so that the nozzle-member is readily accommodated in a corresponding hole. After each nozzle-member is completely screwed into the hole, a plug is screwed into the hole so that one end of each hole is perfectly sealed. However there is provided a gap between the nozzle-member and the screwed plug, wherein the gap space is arranged to be communicated with a liquid guiding path. Furthermore, although the number of nozzle-members is not critical, each pair of discharging apertures, which are respectively formed between respective free open ends of the holes and the respective leading ends of the nozzle-members, is substantially oppositely disposed to each other on a head surface of the body-member with respect to the center of the head surface. Furthermore, each pair is so arranged that respective tube-like two-phase flows discharged from the respective apertures will collide each other, with the angle of collision between the paired tube-like flows being at right angles.

A a coupled adaptor and body-member includes two kinds of internal paths for introducing respectively at least one kind of liquid and the compressed air from the adaptor to respective spaces and passages in and around respective nozzle-members. As will be described later, the compressed air generated by a roots blower is first introduced into the air inlet provided for the adaptor and then branches into respective compressed air guiding paths constituted by respective through bores. The compressed air thus fed into a guiding path is then supplied to each pre-discharging air space within each through bore. On the other hand, the liquid such as water is first introduced into the liquid inlet provided in the adaptor and then branches into respective liquid guiding paths.

The nozzle-member is composed of a tip-portion made of a ceramic and a base portion which is made of a metallic material and which is provided with an externally threaded portion. The tip portion is shaped approximately in a bullet-like shape and the leading portion has an approximately mushroom-like shape so that an annular recessed part may be specifically formed. Furthermore, the location of the tip-portion in relation with the axis of the through bore is such that a throat portion having a certain annular width is formed within the pre-discharging air space of the through bore. The liquid guiding path is communicated with the gap space and the space itself is, on the other hand, communicated with liquid feeding bores through a longitudinal passage which is provided in the nozzle-member along its axis. The liquid guiding bore opens towards the outside of the nozzle-member at the tip portion, and the bore is positioned between the throat portion and the annular recessed part. As is clear from the above description, since the compressed air path is directly communicated with the pre-discharging air space, the compressed air fed into the pre-discharging air space is discharged into the atmosphere through the throat portion and the discharging aperture.

By the arrangement described hereinabove, in a situation in which the compressed air passed through the throat portion is continuously discharged from the discharging aperture, the pressure prevailing in the vicinity of each opening of each bore is relatively negative when compared with the pressure prevailing either inside of the compressed air path or an open space. Such being the case, the liquid within the longitudinal passage is being continuously drawn in through the bores. The liquid thus drawn in from the passage is first split into parts by a superimposing effect caused by a relative velocity difference between the flow of compressed air and the flow of liquid and a confused turbulent flow is thus produced, while the liquid parts are entrained by the flow of compressed air. The liquid parts, which are entrained by the flow of compressed air successively violently collide with the annular edge portion, whereby respective liquid parts are further split into much smaller liquid particles and uniformly distributed in the compressed air flow accordingly. As a result, the flow of compressed air includes numerous minute particles of liquid and is in the form of a developed two-phase flow at the instant of its discharge from the discharging aperture. Subsequently, as described previously, respective tube-like flows, which are discharged from respective discharging apertures of the present atomizing unit, are further arranged to successively collide in a violent manner at the point described earlier. Due to multiple collisions of respective tube-like flows, not only are liquid particles entrained by the tube-like flows of compressed air violently impinged against each other, but also a confused turbulent flow field for splitting the liquid particles is further brought about, whereby minute liquid particles entrained by the respective tube-like flows are further split into a still larger number of much finer liquid particles and then further forwardly dispersed as a stream of mist by a secondary flow produced at the point described above.

As is described hereinabove, since the atomizing unit of the present invention is capable of not only generating a mist of at least one kind of liquid with a particle-diameter distribution as narrow as possible with an average of at most several tens of microns, but also of generating a large amount of mist of the above-described type with a relatively small amount of air under comparatively low compressed pressure conditions, fields in which the mist generated by the atomizing unit according to the present invention can be used are quite broad as described in detail hereinbelow. However, it is to be noted here that there are a number of possibilities for the use of the atomizing unit according to the present invention in a number of unexpected fields in the near future, due to its excellent atomizing characteristics.

BRIEF DESCRIPTION OF THE DRAWINGS

These and other object and features of the present invention will become apparent from the following description taken in conjunction with the preferred embodiment thereof with reference to the accompanying drawings in which:

FIG. 7 is a partial side view of the atomizing unit shown in FIG. 6, FIG. 8 is a schematic diagram for explaining the atomizing achieved by any one of the embodiments shown above, FIG. 9(a) is a fragmentary sectional diagram explanatory of the two-phase tube-like flow which is discharged from any one of the embodiments shown in FIGS. 1, 4 and 5, and FIG. 9(b) is a fragmentary sectional diagram explanatory of the two-phase tube-like flow which is discharged from the embodiment shown in FIG. 6.

Before the description of the present invention proceeds, it is to be noted that like parts are designated by like reference numerals throughout several views of the accompanying drawings, unless otherwise indicated.

DETAILED DESCRIPTION OF THE INVENTION

Figure 1:
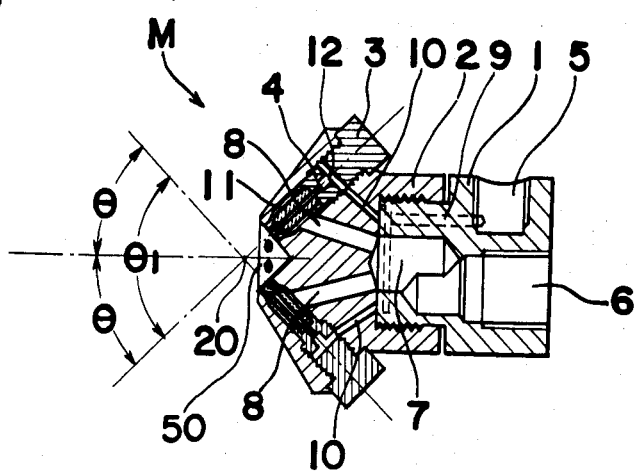
FIG. 1 is a side sectional view of an atomizing unit according to one preferred embodiment of the present invention.
Figure 2:
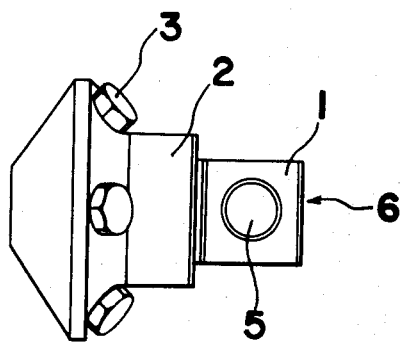
FIG. 2 is a side elevational view of the atomizing unit shown in FIG. 1.
Figure 3:
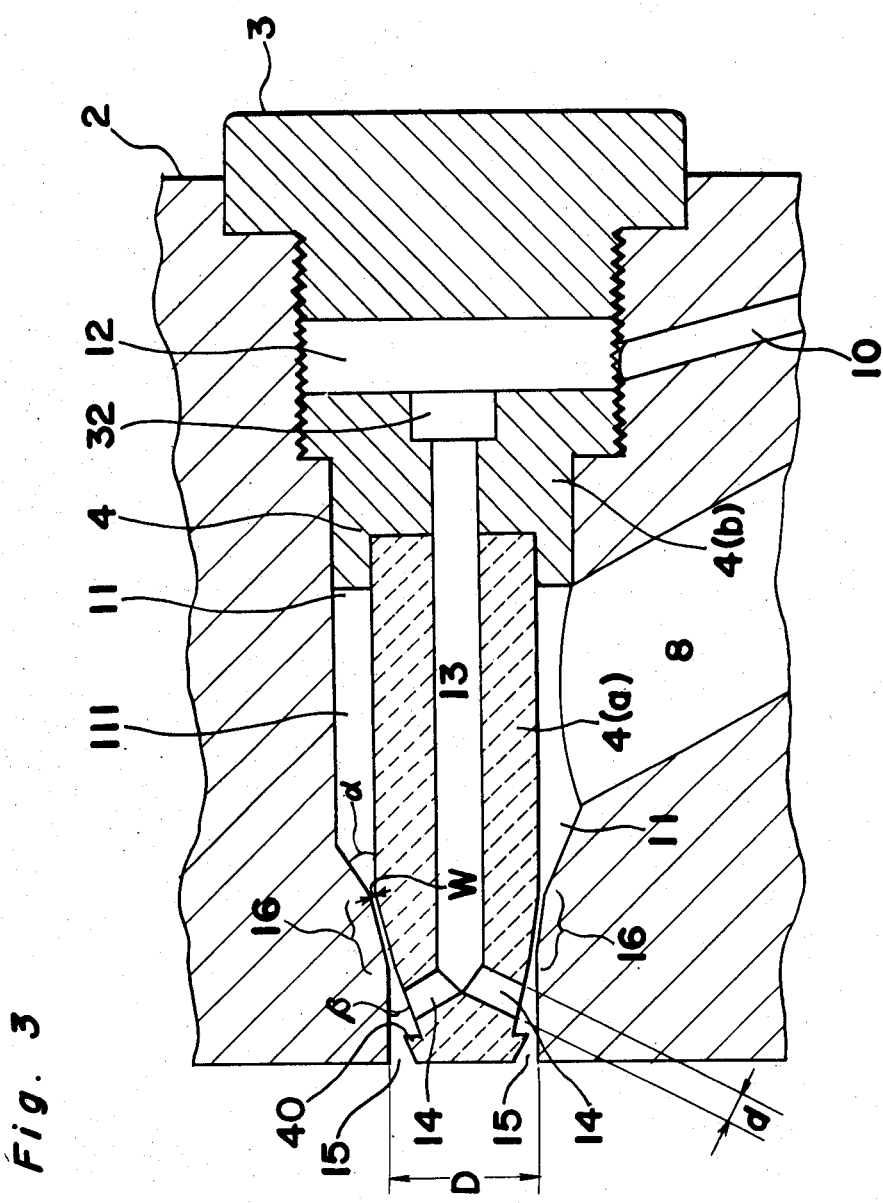
FIG. 3 is a partial side sectional view showing, on an enlarged scale, details of the construction of a nozzle-member employed in the atomizing unit shown in FIG. 1.

Referring now to FIGS. 1 to 3, there is shown one preferred embodiment of a two-phase type atomizing unit M according to the present invention.

As is shown in FIG. 1, the atomizing unit according to the present embodiment comprises an adaptor 1 having inlets 5 and 6 which are both adapted to have coupled thereto respective members for introducing a compressible fluid and an incompressible fluid therethrough, a body-member 2 which is coupled to a head portion of the adaptor 1 by a threaded connection, and a plurality of nozzle-members 4 (six nozzle-members in this embodiment) which are respectively accommodated inside a head portion of the body-member 2 in a manner such that respective extensions of the central axial lines of the respective nozzle-members 4 meet at a point 20 spaced forwardly of the body member at equal distances from the front ends of respective nozzle-members 4. Accordingly, the number of holes 11, which are provided in the body-member 2 and are partially internally threaded respectively; is equivalent to the number of the nozzle-members 4 provided. Each nozzle-member 4 is provided with a rectangular groove 32 (FIG. 3) at its base end for engagement by a screw driver, so that the nozzle-member can be readily screwed into the corresponding hole 11. After each nozzle-member 4 has been screwed completely into the hole 11, a plug 3 is screwed into the hole 11 so that the rear end of each hole 11 is perfectly sealed as shown in FIG. 3. As is clear from FIG. 3, a space is provided between the fully screwed in nozzle-member 4 and the fully screwed in plug 3, which is in communication with an incompressible fluid passage or a liquid passage 10 according to the present embodiment. Furthermore, although the number of nozzle-members 4 is not critical for the atomizing unit of the present invention, the discharging apertures of each pair of discharging apertures 15, which are respectively formed between respective free open ends of the holes 11 and the respective leading ends of the nozzle-members 4 therein are substantially diametrically oppositely disposed to each other on the head surface 50 of the body-member 2, with respect to the center of the head surface. Furthermore, each pair is so arranged that respective two-phase tube-like flows discharged from the respective apertures 15 collide with each other at the point 20, with the angle of collision between the paired tube-like flows being at right angles. As a result, the angle ($\theta_1$) between each pair mentioned above is 90 degrees. Strictly speaking, the angle ($\theta_1$) is the angle between respective center lines of the pairs of nozzle-members.

Generally, it is well known that the effectiveness of atomization is increased as the impinging or colliding angle of two fluids is increased. However, as far as the atomizing unit of the present type is concerned, since the dispersion of resultant mist toward the head portion and resultant drip of liquid from the head portion are both extremely undesirable, it has been confirmed that the most preferable angle ($\theta_1$) is an approximate right angle according to the present invention.

As shown in FIGS. 1 and 3, the atomizing unit according to the present invention includes two kinds of internal paths for respectively introducing liquid and compressed air from the adaptor 1 to respective spaces and passages in and around respective nozzle-members 4. The compressed air generated with the help of a roots blower or the like is first introduced into the compressed air inlet 6 provided in the adaptor 1 and successively is bypassed or fed into respective compressed air passages in the body member 2 through a compressed air feeding passage 7 in the adapter 1. The compressed air thus fed into each passage 8 is then supplied to a pre-discharging air space 111 inside each hole 11 between the nozzle 4 and the inner surface of the bore. On the other hand, liquid such as water is first introduced into the liquid inlet 5 provided in the adaptor 1 and is introduced into a liquid feeding passage 9 in the adapter 1. The upstream portion of the liquid feeding passage 9 runs towards the head portion of the body-member 2 a parallel to the axis of the adaptor 1, and the downstream portion extends in an annular path with respect to the axis, whereby the liquid is introduced into respective liquid feed passages 10 in the body member 2.

Still referring to FIG. 3, there is shown a detailed view of the nozzle-member 4 to show the paths in and around the nozzle-member 4 through which the respective air and liquid are guided. The nozzle-member 4 is composed of a tip portion 4a made of a ceramic or the like, and a base portion 4b made of a metallic material, the tip portion 4a being coupled to and connected to the base portion 4b with a bonding agent such as an epoxy resin adhesive. The outer configuration of the tip portion 4a is approximately bullet-shape with the forward end being approximately mushroom-shaped so that an annular recess 40 is present just to the rear of the forward end. The forward end defines the discharge aperture 15 with the forward end of the hole 11. Furthermore, as will be specifically described later, the location of the tip portion 4a along the center line of the hole 11 is such that an annular throat portion 16 having a radial dimension W is provided just forward of the pre-discharging air space 111. The liquid passage 10 communicates with the space or the gap space 12 described earlier, and the space 12 itself is, on the other hand, communicated with a longitudinal passage 13 in the nozzle-member 4. Liquid discharge bores open from the passage 13 toward the outside of the nozzle-member 4 at the tip portion 4a, and open out of the nozzle-member between the throat portion 16 and the annular recess 40, with the axis of each bore being at an angle of more than 90 degrees relative to the center line of the nozzle member 4. The compressed air path 8 opens directly into the pre-discharging air space 111, and the compressed air fed into the space 111 is discharged into the atmosphere through the throat portion 16 and the jetting or discharging aperture 15. As is clear from the arrangement as described above, in a situation in which the compressed air passed through the throat portion 16 is continuously discharged from the discharging aperture 15, the pressure prevailing in the vicinity of the opening from the bore 14 is negative relative to the pressure prevailing either inside the passage 8 or the space 111. Such being the case, the liquid within the longitudinal passage 13 is being continuously drawn through the passage 13 and through the bores 14. The liquid thus drawn through the passage 13 is first broken into pieces by the effect of the velocity difference between the flow of the compressed air and the flow of liquid and a confused turbulent flow will be produced, while the resultant liquid pieces are entrained in the flow of compressed air. The liquid pieces, which are being entrained by the flow of compressed air, successively collide with the annular edge portion of the mushroom-shaped forward end defining the recess 40, whereby respective liquid pieces are further split into much finer liquid particles and are uniformly distributed in the compressed air flow. As a result, the flow of compressed air will include a number of minute liquid particles and will take the form of a developed two-phase flow at the instant of its discharge from the discharging aperture 15. Furthermore, as previously described in conjunction with FIG. 1, respective tube-like flows, which are discharged from respective discharging apertures 15 of the atomizing unit, are further arranged to collide in a violent manner with respect to each other at the point 20 according to the present invention. Due to multiple collisions of respective tube-like flows, not only are liquid particles entrained by compressed air violently impinged on each other, but also a confused turbulent flow for splitting the liquid particles is produced, whereby the minute particles of liquid entrained by the compressed air are further split into much finer particles of liquid and the particles thus split are further entrained and caused to flow in the forward direction by a dispersing air flow which is secondarily generated at the point 20. The flow of the two-phase mixture from the point 20 is gradually decelerated as it disperses forwardly, thereby causing the respective liquid particles to float a in the atmosphere as a mist when the dispersing mixture loses its velocity. According to the experiments which were carried out in connection with the present invention, it was confirmed that, on the average, the two-phase mixture will flow forwardly for a distance more than 4 meters from the point 20 under a windless experimental condition.

As described in the foregoing, an essential object of the present invention is to provide an atomizing unit which is capable of not only generating a mist of liquid the particle-diameter distribution of which is as narrow as possible with an average of at most tens of microns, but also generating a large amount of the mist of the above-described type with a relatively small amount of compressed air at comparatively low pressure. Therefore, in effectively accomplishing the object described above, the atomizing unit of the present invention satisfies the following requirements and should be further arranged to provide a mist such as that specifically shown in FIG. 9(*a*), the features of which will be described in detail hereinafter. The requirement to be satisfied is an arrangement of the unit which makes possible an increase in the rate of discharge of compressed air as much as possible so that the resultant collision at the point 20 by a plurality of tube-like flows will be as intense as possible. For this purpose, as specifically shown in FIG. 3, the passage for the compressed air from the predischarging air space 111 to the discharging aperture 15 is through the throat portion 16, the inner surface of the hole 11 and the outer surface of the tip portion 4*a* being shaped to converge from the space 111 into the throat portion 16, and further being shaped to make the exit end of the throat portion 16 divergent toward the aperture 15. Moreover, the annular space 16 to be relatively effected between the outer end of the tip portion 4*a* and the inner surface of the hole 11, or more particularly, the throat portion 16, has a uniform thickness or radial dimension of W. For the sake of brevity, the overall passage including the convergent portion, throat portion and divergent portion is called a convergent-divergent space hereinafter. As is clear from the description above, the main factors influencing the discharging rate of the two-phase flow or more specifically, the intensity of the collision between the plurality of tube-like flows at the point 20 are the convergent angle ($\alpha$), the divergent angle ($\beta$), and the longitudinal length of the space 16 having the constant thickness W, respectively. On the other hand, the main factors affecting the relationship between the amount of compressed air to be consumed an the amount of atomized liquid or mist and the resultant average diameter of the particles constituting the mist are the inner diameter D of the discharging aperture 15, the thickness W of the throat portion 16, the diameter d of the bore 14, the number of the bores 14, etc.

Furthermore, according to the experiments which were carried out in connection with the present invention, it was confirmed that the amount of mist generated and the average diameter of particles constituting the mist are related to the relative locations of respective bores 14 with respect to the location of the throat portion 16 or respective distances of the respective bores 14 from the location of the throat portion 16. More particularly, the amount of mist generated increases in proportion to an increase of the distance of respective bores 14 from the location of the throat portion 16, while the average diameter of particles constituting the mist becomes, on the contrary, larger. On the contrary, as the distance of the respective bores from the throat portion 16 becomes smaller, the amount of mist generated is accordingly decreased while the average diameter of particles constituting the mist becomes smaller. Such being the case since the object of the present invention is to provide an atomizing unit which is capable of not only generating a mist of liquid the respective particle-diameters of which are as small as possible, but also generating a large amount of the mist of the above-described type with a relatively small amount of compressed air of comparatively low pressure, it is quite important that the relative positions of the bores 14 with respect to the throat portion 16 should be appropriately determined.

The atomizing unit according to the present invention is characterized in that respective two phase tube-like flows, which are respectively discharged from a plurality of the nozzle-members mounted on the unit, are caused to collide in a violent manner with respect to each other at the point 20. Such being the case, as previously described, it is well known that the most effective liquid atomization can be accomplished if one of the pair of tube-like flows is in a head-on collision with the other. Furthermore, in spite of the fact just mentioned above, because the atomizing unit of the present invention is formed in such a compact configuration the relative spacing of the nozzle-members 4 mounted on the body-member 2 as well as the respective angles of the axes of the respective nozzle-members 4 and the axis of the body-member 2 are both important factors as specifically shown in FIG. 1.

The embodiment of the atomizing unit according to the present invention, which has the following dimensions while taking into consideration the specific dimensional factors mentioned above, has the following atomizing characteristics.

1. An atomizing unit provided with six nozzle-members
   (a) Dimensional characteristics
      The convergent angle ($\alpha$): 20 degrees.
      The divergent angle ($\beta$): 12 degrees.
      The length of the throat portion having a uniform thickness of W: 2.85 mm.
      The other dimensions are as follows.
      D: 2.52 mm. W: 0.15 mm. d: 0.5 mm.
      The numbers of the liquid-bores: 6
      The distance between the end of the parallel throat portion to the respective center lines of the respective liquid bores: a length equivalent to d/2, i.e., for this embodiment: 0.25 mm.
      The relative lateral spacing between two neighboring nozzle-members for six nozzle-members: 4 mm.
      The respective angle between the axes of the nozzle-members and the axis of the body member: 45 degrees.
   (b) Experimental conditions
      The pressure of the compressed air: 0.7 Kg/cm$^2$.
      The amount of the compressed air consumed: 120 Nl/min.
      The liquid feeding pressure: 0 Kg/cm$^2$.
   (c) Results of the experiments The amount of liquid used was 13 l/hr. and the maximum particle diameter of liquid caught at a point by 2 meters from the head of the atomizing unit was found to be 80 microns, while almost all of the particle diameters were less than 1 micron. The two-phase mixture generated by the atomizing unit according to this embodiment was capable of being projected forwardly more than 4 meters. Moreover, the liquid atomized and then dispersed in a substantially horizontal direction by the atomizing unit which was disposed at a height of 1.5 meters above a floor did not cause the floor to be wetted at all according to the present invention.

Figure 4:
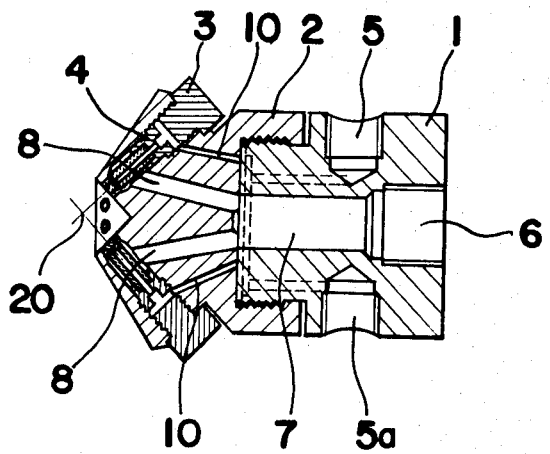
FIG. 4 is a view similar to FIG. 1, but particularly shows a modified embodiment of the atomizing unit shown in FIG. 1.

Referring now to FIG. 4, there is shown one modified embodiment of the atomizing unit having six nozzle-members similar to the embodiment of FIGS. 1 to 3. According to this modified embodiment, the atomizing unit has two liquid inlets 5 and 5a, but is provided with only a single compressed air atomizing unit is provided with a single compressed air inlet 6. Due to the provision of two liquid inlets for this atomizing unit, two kinds of liquids can be supplied to the unit, whereby two kinds of liquids can be mixed with each other in the course of the atomizing process. Therefore, if the liquids are properly selected in advance, a homogeneous mixture of two kinds of liquids can be atomized so that a chemically homogeneous mixture is produced as a single mist. Moreover, according to the present modified embodiment, two kinds of liquids, which are respectively fed into the unit through respective liquid flow inlets and are successively atomized, can be mixed in a floating condition and the two atomized liquids can be mutually chemically reacted under a misting condition of the two liquids. The number of the liquid flow inlets can be correspondingly increased up to the number of the nozzle-members mounted on the unit, if necessary. As far as utilizations of the atomizing unit of the above-described type are concerned, when a waste oil or a waste liquid which is arranged to be discharged from three nozzle-members, and a fuel oil provided as an initiator of combustion and which is arranged to be discharged from the other three nozzle-members, are atomized either in a simultaneous atomizing or in a successive atomizations, the waste oil or liquid can be brought into a combustible state due to the presence of the mist of waste oil or liquid constituted by a number of liquid-particles each having a minute liquid particle so that the waste liquid or oil can be completely burnt. An effective utilization of the atomizing unit of the above-described type is one wherein a two-fluid system of water and fuel is atomized so that an economical combustion can be effected. More specifically, the unit can generate two kinds of mists, i.e. of water and fuel oil, in an effective manner and the resultant mist of fuel oil is burnt in the presence of water mist, whereby the unit can function to hold generation of NO$_x$ as low as possible. Accordingly, the utilization of the unit of the present invention for the purpose mentioned above is quite promising from the standpoint of economical combustion.

Figure 5B:
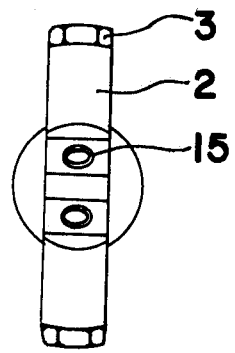
FIG. 5(b) is a front elevational view of the modified embodiment shown in FIG. 5(a)
Figure 5A:
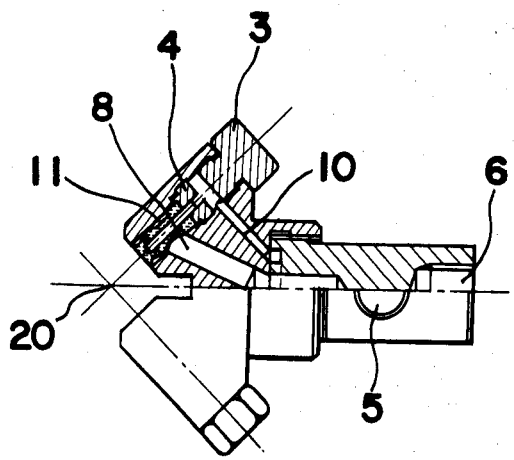
FIG. 5(a) is a view similar to FIG. 1, but particularly, partially shows a modified embodiment of the atomizing unit shown in FIG. 1.

Referring now to FIG. 5, there is shown a further modified embodiment of the atomizing unit according to the present invention, wherein the number of the nozzle-members is two and the remaining configurational characteristics are almost the same as those of the embodiment of FIGS. 1 to 3. The embodiment provided with the following dimensions while taking into consideration specific dimensional factors mentioned earlier, has the following atomizing characteristics.

2. An atomizing unit provided with two nozzle-members
   (a) Experimental conditions
      The pressure of the compressed air: 0.7 Kg/cm$^2$.
      The amount of the compressed air consumed: 58 Nl/min.
      The liquid feeding pressure: 0 Kg/cm$^2$.
      The suction-pressure of liquid at respective bores: a water-head of 100 mm.
   (b) Results of the experiments The amount of liquid atomized was 8.4 l/hr. and the maximum particle diameter of liquid at a certain point forward of the head of the atomizing unit was found to be 140 microns, while almost all of the particle diameters were less than 1 micron. The two-phase mixture generated by the atomizing unit according to this embodiment was capable being dispersed forwardly from the atomizer for more than 3 to 4 meters.

It was further confirmed in the experiments that the atomizing unit provided with two nozzle-members was sometimes superior to the atomizing unit with six nozzle-members with respect to atomizing characteristics under approximately the same experimental conditions. This is due to the fact that a simultaneous multiple collision of a plurality of tube-like flows at the point 20, with each pair being at the predetermined collision angle with respect to each other, can sometimes become difficult as the number of the tube-like flows is increased, unless the configuration of the unit provided with six nozzle-members together with its atomizing conditions are both carefully arranged in advance to achieve the most preferred atomizing conditions.

Figure 6:
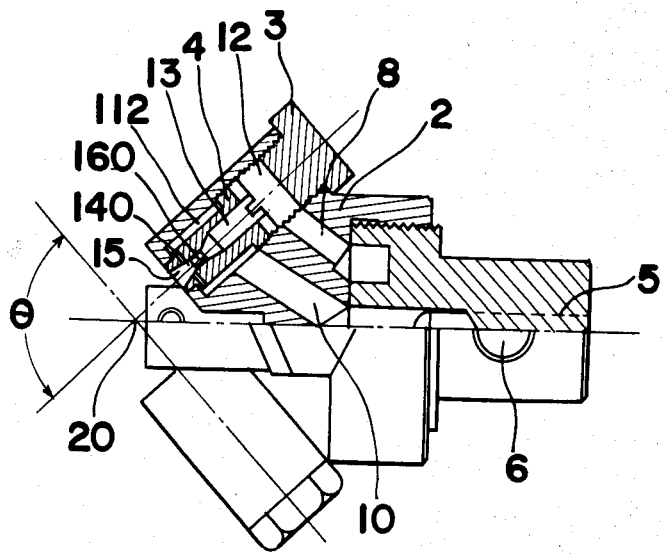
FIG. 6 is a view similar to FIG. 1, but particularly, partially shows a modified embodiment of the atomizing unit shown in FIG. 1.

Referring now to FIGS. 6 and 7, there is shown a still further modified embodiment of the atomizing units according to the present invention. The arrangement of this embodiment is substantially different from all the embodiments described in the foregoing in the following respects. In this embodiment, the space or gap portion 12 is communicated with the compressed air passage 8, while a pre-discharging liquid space 112 which is for the liquid is communicated with the liquid passage 10. Therefore, as clear from this arrangement, the compressed air is introduced into the longitudinal passage 13 in the nozzle-member 4. Moreover, the longitudinal passage 13 further has a convergent portion, a throat portion and a divergent portion in series, the end portion of the convergent portion being directly communicated with one end of the longitudinal passage 13, and with one end of divergent portion itself, on the other hand, constituting the discharging aperture 15 as specifically shown in FIG. 6. A plurality of liquid bores 140 are provided in the nozzle-member 4 in a manner such that one end of each sucking bore 140 opens towards the inside of the base portion of the divergent portion, with respective ends being spaced with respect to each other around the circumference of the base portion, while the other end of each bore 140 is communicated with the pre-discharging liquid space 112. As is clear from this arrangement, in a situation in which the compressed air guided through the longitudinal passage 13 and then passed through the throat portion 160 is continuously discharged from the discharging aperture 15, a relatively negative pressure will be present, when the compressed air is passed through the throat portion 160. Accordingly, the pressure prevailing in the vicinity of the inner ends of the bores 140 is also effected to be relatively negative and thus the liquid within the space 112 is continuously drawn through the bores 140. Such being the case, the liquid thus drawn in is first split into pieces by the action of the flow of compressed air, and the resultant split liquid pieces are entrained by the compressed air. As previously described, similar to the results achieved by the other embodiments described above, respective tube-like flows, which are discharged from respective discharging apertures 15, collide in a violent manner with respect to each other at the point 20. Although the atomizing unit of the above-described type is provided with four nozzle-members as specifically shown in FIG. 7, the number of the nozzle-members mounted on the body member 2 is not critical. However, as specifically described earlier, the atomizing unit provided with two nozzle-members may be conveniently employed even for this type.

According to the present invention, the atomizing achieved by each of the embodiments is generally the same and a typical one is schematically shown in FIG. 8. However, as specifically shown in FIGS. 9(a) and 9(b), there is a substantial difference in the specific atomization achieved by the embodiments of FIGS. 1 to 5 and that achieved by the embodiment of FIG. 6. The tube-like flows which are discharged from the embodiments shown in FIGS. 1 to 5 has a cross sectional configuration as shown in FIG. 9(a) whereas the tube-like flow, which is discharged from the embodiment shown in FIG. 6, has a cross-sectional configuration as shown in FIG. 9(b). As is clear from the comparison of these two figures, the particles of liquid shown in FIG. 9(b) are not so well distributed and more specifically, the particles of liquid 21 are annularly distributed, with the compressed air 22 being, on the other hand, concentrated in the core portion of the cross-sectional area. Such being the case, the particles of liquid, which should be entrained by the tube-like flow, are often caused to flow away from the bulk of the tube-like flow, thereby resulting in these particles having a rather larger diameter and being forced to fall gravationally, thus causing surfaces beneath the flow to be wet well before respective tube-like flows collide at the colliding point. As the result, the embodiments shown in FIGS. 1 to 5 are considered to be much more effective in operation as compared with the other embodiment.

As is clear from the foregoing description, the atomizing unit of the present invention comprises a plurality of nozzle-members of the two-phase type, with each mounted in the unit in a manner such that respective extensions of the axes thereof meet at a point spaced a predetermined distance forward from the head of the unit, and each nozzle-member is constructed so it can atomize at least one kind of liquid, prior to its discharge from the nozzle-member by entraining liquid in a flow of compressed compressible fluid inside the nozzle-member. The respective tube-like flows discharged from the respective nozzle-members further violently collide at the point mentioned above, whereby respective particles of liquid are further split into a large number of minute particles and then further dispersed forwardly of the atomizing unit as a stream of mist by the secondary flow effected at the point mentioned above. The average particle diameter of liquid in the mist thus produced is approximately several tens of microns at a point spaced several meters from the meeting point.

Instances where the mist required can be generated by the atomizing unit according to the present invention are frequent and from a wide range of uses. Some preferable applications are listed in the following.

In processes requiring uniform, forced convection cooling, for example, a process for treating high-temperature metallic material such as iron and the like or a process for manufacturing glass products such as a plate glass, porcelain, circulation of a low-temperature air including mist generated by the unit of the present invention can be quite effective for uniformly and rapidly cooling heated objects to respective predetermined temperature levels.

In a case wherein a working space, for example, in a hospital or a food manufacturing factory should be subjected to disinfection, it is quite effective to fumigate the room with a mist of an antiseptic solution constituted by a large amount of liquid particles each having a minute particle diameter which is generated by the atomizing unit of the present invention, since respective minute particles of the solution can penetrate into any small spots such as cracks in walls and can be dispersed onto the rear surfaces of any items in the room.

In a case wherein a greenhouse or the like should be fumigated with a mist of insecticide under an operatorless condition, the mist atomized by the atomizing unit according to the present invention is quite effective for completely killing insects as the minute particles of solution floating in the air inside the greenhouse can easily stick to any parts of plants, even to respective under surfaces of leaves of plants. Furthermore, in an operation for achieving a humid condition and a room temperature of the greenhouse is concerned, it is especially effective in the summer season, if underground water is being continuously atomized by the unit of the present invention, with the mist circulated within the greenhouse being simultaneously drawn the outside by a conventional fan. Conventionally, since the particle diameters of water particles constituting the mist generated by a conventional atomizer are larger, the plants within the greenhouse may be rotted by such large particles of water, which fall gravitationally in the course of the circulation.

As is described hereinabove, since the atomizing unit of the present invention is capable of not only generating a mist of at least one kind of liquid with a particle-diameter distribution as narrow as possible with an average of at most several tens of microns, but also of generating a large amount of mist of the above-described type with a relatively small amount of compressed air at comparatively low pressure, there are possibilities for the atomizing unit to be employed in unforseen fields in the near future.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed being included therein.

What is claimed is:

1. A process for generating a mist of at least one incompressible fluid in an atmosphere of a compressible fluid, comprising:
    forming at least two annular flows of the compressible fluid flowing substantially parallel to the longitudinal axis of the annular flow;
    forming a low pressure zone in each of said annular flows and drawing the incompressible fluid into said low pressure zones and breaking the incompressible fluid into small fluid particles and entraining the particles in the annular flows;
    directing said two annular flows with the fluid particles entrained therein to cause them to collide with each other for further breaking up the particles of the incompressible fluid and for producing a stream of mist flowing away from the collision point and in which said further broken up particles are entrained.

2. An atomizing unit for producing atomization of compressible fluid and incompressible fluid phases, comprising:
    a body member having a plurality of passages therein, one carrying a compressible fluid under pressure and at least one for carrying an incompressible fluid, said body member further having a plurality of nozzle receiving holes therein opening out of the forward end of said body member; and
    a plurality of nozzle members mounted in said holes in said body member, one end of each nozzle member being adjacent the end of the corresponding hole which opens out of said body member and having a diameter less than the diameter of the hole to define with the hole an annular discharge aperture, the portion of the hole around said one end of said nozzle member being substantially right cylindrical in shape, each nozzle member having a longitudinal passage therethrough having an upstream end within said body member in communication with said incompressible fluid passage and having the downstream end branched into a plurality of bores opening laterally from said one end of said nozzle member, each nozzle member having a diameter intermediate the length thereof which is less than the diameter of the hole for forming a space around the nozzle member, said space being in communication with said compressible fluid passage, said nozzle members being positioned in said body member such that forward extensions of the longitudinal axes thereof meet at a point spaced forwardly of the body member at equal distances from the one ends of the nozzle members, said spaces around said nozzle members each having a narrow portion between the portion communicating with said compressible fluid passage and said annular discharge aperture for causing the flow of said compressible fluid past said bores opening out of said one end of said nozzle member to suck incompressible fluid from longitudinal passage through said bores so as to entrain said incompressible fluid in said compressible fluid.

3. An atomizing unit as claimed in claim 3 in which said discharging apertures are in pairs with the apertures in each pair diametrically opposite each other with respect to the longitudinal axis of said body member, and the extensions of the axes of said nozzle members in each pair intersecting at said point at a right angle.

4. Atomizing unit as claimed in claim 3, wherein each nozzle-member has a forward end portion which is made of a ceramic, the remainder of said nozzle-member being made of a metallic material, said nozzle-member having a base member at the rear end threaded into the corresponding hole, said base member having a transverse diametrically extending groove for receiving a screw driver.

5. Atomizing unit as claimed in claim 2, wherein each pair of discharging apertures which are respectively formed between respective free ends of said respective surrounding spaces and said respective ends of respective nozzle-members is substantially oppositely disposed to each other, on a surface-portion of said body-member, with respect to a center of said surface-portion, respective center lines of said each pair of said discharging apertures being arranged to meet at right angles at said point.

* * * * *